(12) United States Patent
Meyers

(10) Patent No.: US 8,303,808 B1
(45) Date of Patent: Nov. 6, 2012

(54) FUEL FILTER ASSEMBLY

(76) Inventor: Kevin J. Meyers, Rapid City, SD (US)

( * ) Notice: Subject to any disclaimer, the term of this patent is extended or adjusted under 35 U.S.C. 154(b) by 279 days.

(21) Appl. No.: 12/828,841

(22) Filed: Jul. 1, 2010

(51) Int. Cl.
*B01D 35/153* (2006.01)

(52) U.S. Cl. ......................................... 210/136; 210/446

(58) Field of Classification Search .................. 210/136, 210/446
See application file for complete search history.

(56) References Cited

U.S. PATENT DOCUMENTS

| | | | |
|---|---|---|---|
| 4,011,848 A | 3/1977 | Coddington | |
| 4,495,068 A * | 1/1985 | Rosaen | ............................ 210/91 |
| 5,989,413 A | 11/1999 | Jauss et al. | |
| D466,969 S | 12/2002 | Druga | |
| 6,527,947 B1 | 3/2003 | Channing et al. | |
| 6,746,603 B2 | 6/2004 | Harvey et al. | |
| 6,835,235 B2 * | 12/2004 | Pilgram et al. | ................... 96/134 |
| 6,974,538 B2 | 12/2005 | Baumann et al. | |
| 7,406,954 B2 | 8/2008 | Breuer et al. | |
| 2001/0027779 A1 | 10/2001 | Iwai et al. | |
| 2006/0053756 A1 | 3/2006 | Hawkins et al. | |

* cited by examiner

*Primary Examiner* — Terry Cecil

(57) ABSTRACT

A fuel filter assembly for preventing backflow of fuel into the fuel line from the fuel tank after the fuel has entered the fuel filter includes a housing having an interior, an inlet port and an outlet port. A filter member and a cage member are positioned in the interior of the housing. The cage member is positioned adjacent to the inlet port of the housing. A stopper member is positioned in the cage member. A biasing member is positioned in the cage member and coupled to the stopper member such that the biasing member urges the stopper member into contact with the housing around the inlet port. Thus, fluid flow through the inlet port is prevented while the stopper member contacts the housing around the inlet port. The biasing member is compacted by fluid flow pressure to permit fluid flow into the housing through the inlet port.

7 Claims, 3 Drawing Sheets

FUEL FILTER ASSEMBLY

BACKGROUND OF THE DISCLOSURE

1. Field of the Disclosure

The disclosure relates to fuel filters and more particularly pertains to a new fuel filter for preventing backflow of fuel into the fuel line from the fuel tank after the fuel has entered the fuel filter.

2. Summary of the Disclosure

An embodiment of the disclosure meets the needs presented above by generally comprising a housing having an interior, an inlet port and an outlet port. A filter member and a cage member are positioned in the interior of the housing. The cage member is positioned adjacent to the inlet port of the housing. A stopper member is positioned in the cage member. A biasing member is positioned in the cage member and coupled to the stopper member such that the biasing member urges the stopper member into contact with the housing around the inlet port. Thus, fluid flow through the inlet port is prevented while the stopper member contacts the housing around the inlet port. The biasing member is compacted by fluid flow pressure to permit fluid flow into the housing through the inlet port.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
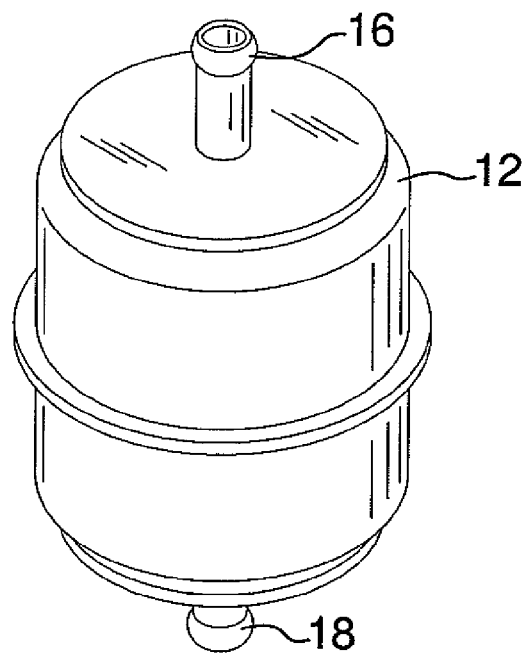
FIG. 1 is a front top side perspective view of a fuel filter assembly according to an embodiment of the disclosure.
Figure 5:
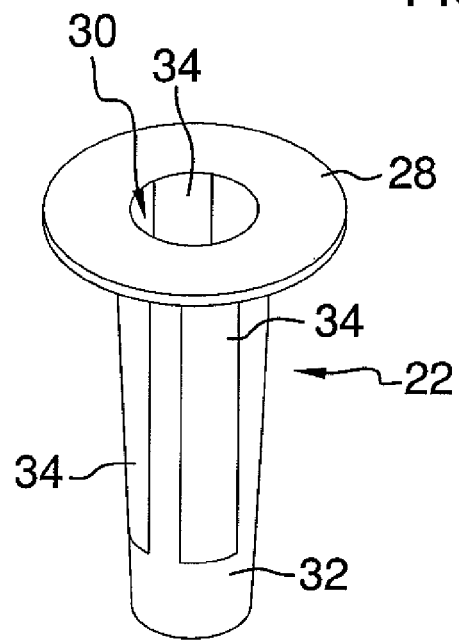
FIG. 5 is a front top side perspective view of a cage member of an embodiment of the disclosure.
Figure 3:
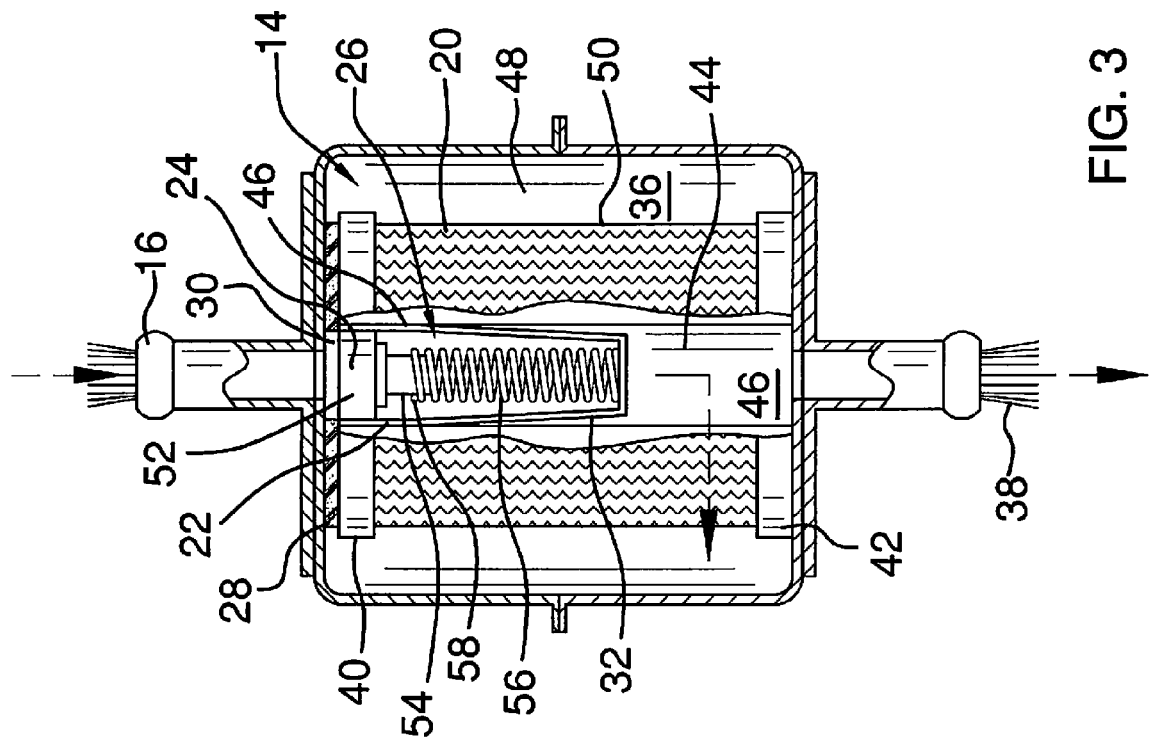
FIG. 3 is a cross-sectional view of an embodiment of the disclosure taken along line 3-3 of FIG. 2.
Figure 2:
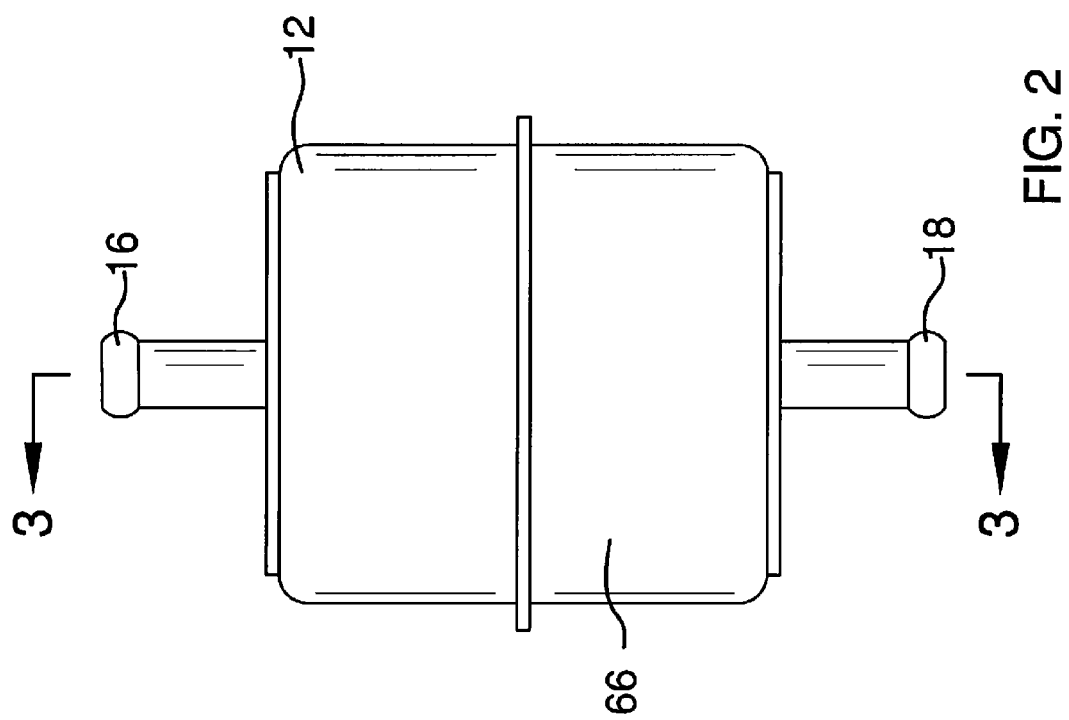
FIG. 2 is a side view of an embodiment of the disclosure.
Figure 4:
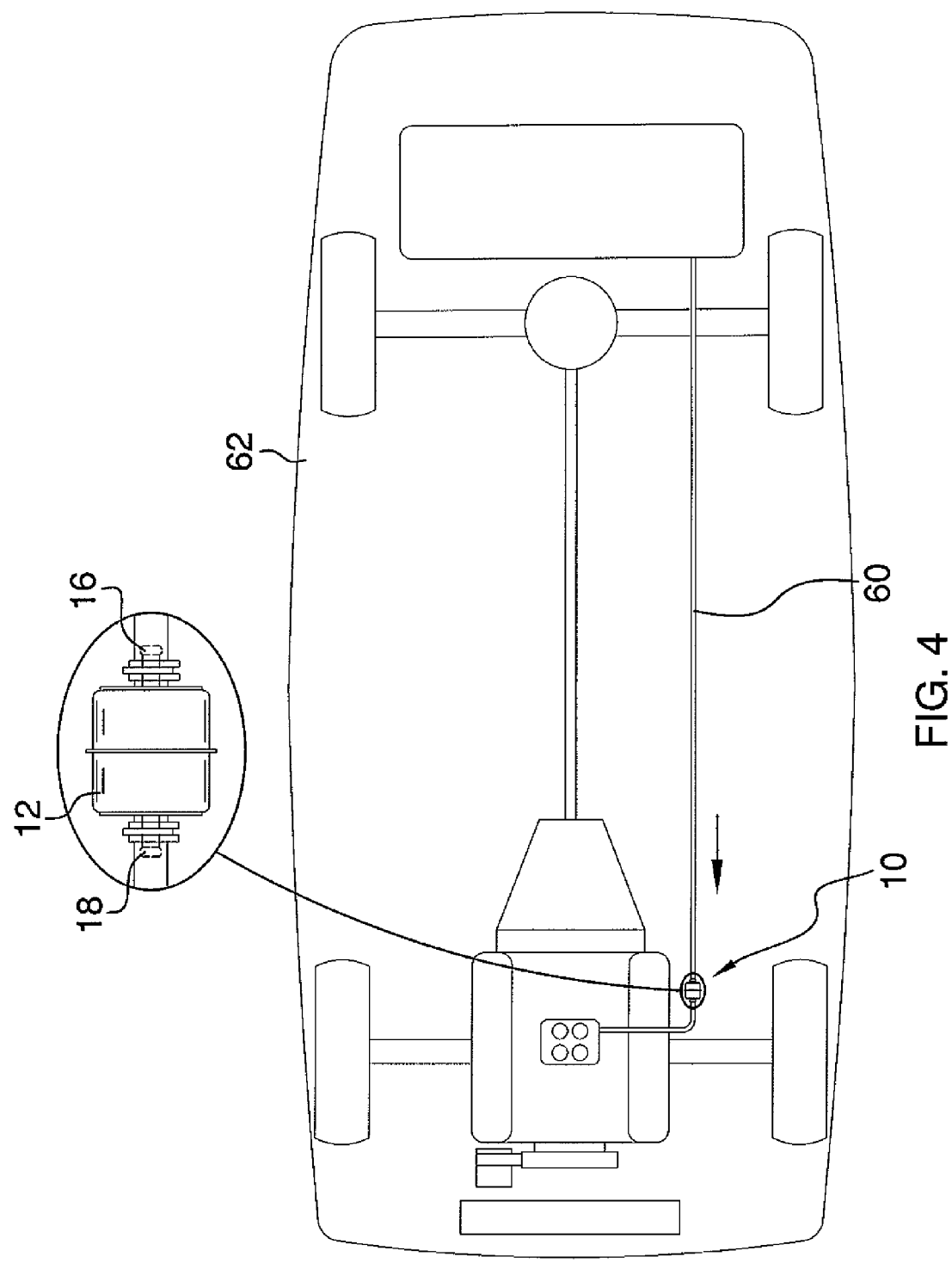
FIG. 4 is a bottom view of an embodiment of the disclosure in use.

With reference now to the drawings, and in particular to FIGS. 1 through 5 thereof, a new fuel filter embodying the principles and concepts of an embodiment of the disclosure and generally designated by the reference numeral 10 will be described.

As best illustrated in FIGS. 1 through 5, the fuel filter assembly 10 generally comprises a housing 12 having an interior 14, an inlet port 16 and an outlet port 18. A filter member 20 is positioned in the interior 14 of the housing 12. A cage member 22 is positioned in the interior 14 of the housing 12. The cage member 22 is positioned adjacent to the inlet port 16 of the housing 12. A stopper member 24 is positioned in the cage member 22. A biasing member 26 is positioned in the cage member 22 and is coupled to the stopper member 24 such that the biasing member 26 urges the stopper member 24 into contact with the housing 12 around the inlet port 16. Thus, fluid flow through the inlet port 16 is prevented while the stopper member 24 contacts the housing 12 around the inlet port 16. The biasing member 26 is compacted by fluid flow pressure to permit fluid flow into the housing 12 through the inlet port 16.

The housing may have a main portion 66 having a length ranging from 2 inches to 2.5 inches. The inlet port 16 and the outlet port 18 may each extend from the main portion 66 by a distance of one half to one inch. A diameter of the inlet port 16 and outlet port 18 may be in the range of ¼ inch to ½ inch.

The cage member 22 may have a planar lip portion 28 having a central opening 30. The cage member 22 may also have a circumferential wall 32 extending from the central opening 30. A plurality of openings 34 are provided in the circumferential wall 32 for permitting fluid flow out of the cage member 22 through the openings 34 when fluid flows through the inlet port 16 into the cage member 22. The lip portion 28 of the cage member 22 is compressed between the filter member 20 and an interior surface 36 of the housing 12 proximate the inlet port 16. The plurality of openings 34 in the cage member 22 are positioned adjacent to the filter member 20. Thus, the cage member 20 is designed for directing a fluid 38 through the filter member 20 when the fluid 38 passes through the plurality of openings 34 in the cage member 22.

The filter member 20 may have a first end 40 contacting the lip portion 28 of the cage member 22 and a second end 42 contacting the interior surface 36 of the housing 12 around the outlet port 18 such that the interior 14 is divided into an inner space 44 surrounded by an interior surface 46 of the filter member 20 and an outer space 48 between an exterior surface 50 of the filter member 20 and the housing 12.

The outlet port 18 may be aligned with the inner space 44 such that fluid 38 must pass from the outer space 48 through the filter member 20 into the inner space 44 to pass through the outlet port 18.

The stopper member 24 may have a head portion 52 and a stem portion 54. The biasing member 26 may be a coil 56. The stem portion 54 of the stopper member 24 may be inserted into a first end 58 of the coil 56.

The circumferential wall 32 of the cage member 22 may be constructed of an elastomeric material and have an unexpanded diameter less than a diameter of the head portion 52 of the stopper member 24. Thus, the circumferential 32 wall snugly receives the head portion 52 of the stopper member 24.

In use, the housing 12 is installed on a fuel line 60 of a vehicle 62. As fuel is pumped through the fuel line 60, fluid pressure on the stopper member 24 compacts the biasing member 26 and permits fuel to flow into the housing 12 through the inlet port 16. The fuel is then diverted through the openings 34 through the filter member 20 before passing through the outlet port 18. When fuel is not being pumped through the fuel line 60, the biasing member 26 expands so the stopper member 24 prevents backflow of the fuel through the inlet opening 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A fuel filter assembly comprising:
   a housing having an interior, an inlet port and an outlet port;
   a filter member positioned in said interior of said housing;
   a cage member positioned in said interior of said housing, said cage member being positioned adjacent to said inlet port of said housing;
   a stopper member positioned in said cage member;
   a biasing member positioned in said cage member, said biasing member being coupled to said stopper member such that said biasing member urges said stopper member into contact with said housing around said inlet port whereby fluid flow through said inlet port is prevented while said stopper member contacts said housing around said inlet port, wherein said biasing member is compacted by fluid flow pressure to permit fluid flow into said housing through said inlet port;
   said cage member having a planar lip portion, said planar lip portion having a central opening;
   said cage member having circumferential wall extending from said central opening;
   a plurality of openings in said circumferential wall for permitting fluid flow out of said cage member through said openings when fluid flows through said inlet port into said cage member; and
   said circumferential wall of said cage member is constructed of an elastomeric material and has an unexpanded diameter less than a diameter of said stopper member whereby said circumferential wall snugly receives said stopper member.

2. The fuel filter assembly of claim 1, wherein said lip portion of said cage member is compressed between said filter member and an interior surface of said housing proximate said inlet port.

3. The fuel filter assembly of claim 1, wherein said plurality of openings in said cage member are positioned adjacent to said filter member whereby said cage member is adapted for directing a fluid through said filter member when the fluid passes through said plurality of openings in said cage member.

4. The fuel filter assembly of claim 3, further comprising:
   said filter member having a first end contacting said lip portion of said cage member and a second end contacting said interior surface of said housing around said outlet port such that said interior is divided into an inner space surrounded by an interior surface of said filter member and an outer space between an exterior surface of said filter member and said housing; and
   wherein said outlet port is aligned with said inner space such that fluid must pass from said outer space through said filter member into said inner space to pass through said outlet port.

5. The fuel filter assembly of claim 1, further comprising:
   said stopper member having a head portion and a stem portion;
   said biasing member being a coil; and
   said stem portion of said stopper member being inserted into a first end of said coil.

6. The fuel filter assembly of claim 5, wherein said circumferential wall has an unexpanded diameter less than a diameter of said head portion of said stopper member whereby said circumferential wall snugly receives said head portion of said stopper member.

7. A fuel filter assembly comprising:
   a housing having an interior, an inlet port and an outlet port;
   a filter member positioned in said interior of said housing;
   a cage member positioned in said interior of said housing, said cage member being positioned adjacent to said inlet port of said housing;
   a stopper member positioned in said cage member;
   a biasing member positioned in said cage member, said biasing member being coupled to said stopper member such that said biasing member urges said stopper member into contact with said housing around said inlet port whereby fluid flow through said inlet port is prevented while said stopper member contacts said housing around said inlet port;
   wherein said biasing member is compacted by fluid flow pressure to permit fluid flow into said housing through said inlet port;
   said cage member having a planar lip portion, said planar lip portion having a central opening;
   said cage member having circumferential wall extending from said central opening;
   a plurality of openings in said circumferential wall for permitting fluid flow out of said cage member through said openings when fluid flows through said inlet port into said cage member;
   wherein said lip portion of said cage member is compressed between said filter member and an interior surface of said housing proximate said inlet port;
   wherein said plurality of openings in said cage member are positioned adjacent to said filter member whereby said cage member is adapted for directing a fluid through said filter member when the fluid passes through said plurality of openings in said cage member;
   said filter member having a first end contacting said lip portion of said cage member and a second end contacting said interior surface of said housing around said outlet port such that said interior is divided into an inner space surrounded by an interior surface of said filter member and an outer space between an exterior surface of said filter member and said housing;
   wherein said outlet port is aligned with said inner space such that fluid must pass from said outer space through said filter member into said inner space to pass through said outlet port;
   said stopper member having a head portion and a stem portion;
   said biasing member being a coil;
   said stem portion of said stopper member being inserted into a first end of said coil; and
   wherein said circumferential wall of said cage member is constructed of an elastomeric material and has an unexpanded diameter less than a diameter of said head portion of said stopper member whereby said circumferential wall snugly receives said head portion of said stopper member.

\* \* \* \* \*